US008395814B2

(12) United States Patent
Kurahashi

(10) Patent No.: US 8,395,814 B2
(45) Date of Patent: Mar. 12, 2013

(54) TERMINAL APPARATUS AND IMAGE FORMING APPARATUS MAINTENANCE SYSTEM

(75) Inventor: Masahiro Kurahashi, Tokyo (JP)

(73) Assignee: Canon Kabushiki Kaisha (JP)

( * ) Notice: Subject to any disclaimer, the term of this patent is extended or adjusted under 35 U.S.C. 154(b) by 934 days.

(21) Appl. No.: 12/487,826

(22) Filed: Jun. 19, 2009

(65) Prior Publication Data

US 2009/0316174 A1 Dec. 24, 2009

(30) Foreign Application Priority Data

Jun. 23, 2008 (JP) ................................ 2008-163670

(51) Int. Cl.

*H04N 1/60* (2006.01)
*G06F 15/00* (2006.01)
*G06K 15/00* (2006.01)

(52) U.S. Cl. ........... 358/1.9; 358/1.14; 358/1.15; 399/8; 399/9; 399/11

(58) Field of Classification Search .................. 358/1.9, 358/1.13–1.16, 468; 399/1, 8, 9–11
See application file for complete search history.

(56) References Cited

U.S. PATENT DOCUMENTS

| | | | | |
|---|---|---|---|---|
| 5,243,382 | A * | 9/1993 | Takano et al. | 399/8 |
| 5,950,148 | A * | 9/1999 | Nakagawa et al. | 358/468 |
| 6,400,462 | B1 * | 6/2002 | Hille | 358/1.14 |
| 7,233,406 | B2 * | 6/2007 | Ogura | 358/1.14 |
| 2002/0080390 | A1 * | 6/2002 | Ogura | 358/1.15 |
| 2002/0140976 | A1 * | 10/2002 | Borg et al. | 358/1.16 |
| 2004/0184063 | A1 * | 9/2004 | Baldwin | 358/1.13 |
| 2004/0246520 | A1 * | 12/2004 | Obert | 358/1.15 |
| 2006/0031711 | A1 | 2/2006 | Yokokura | |
| 2009/0128848 | A1 * | 5/2009 | Kamisuwa | 358/1.15 |
| 2009/0327808 | A1 * | 12/2009 | Takizawa | 714/24 |

FOREIGN PATENT DOCUMENTS

| | | | |
|---|---|---|---|
| JP | 03-226770 | A | 10/1991 |
| JP | 09-080987 | A | 3/1997 |
| JP | 11-69063 | A | 3/1999 |
| JP | 2001-352410 | A | 12/2001 |
| JP | 2006-72967 | A | 3/2006 |

OTHER PUBLICATIONS

Japanese Office Action issued in Japanese counterpart application No. JP2008-163670, dated Aug. 21, 2012.

* cited by examiner

*Primary Examiner* — Kimberly A Williams
(74) *Attorney, Agent, or Firm* — Rossi, Kimms & McDowell LLP

(57) ABSTRACT

A terminal apparatus that can identify contents of work conducted to repair an image forming apparatus with its power supply turned off. A terminal apparatus can communicate with the image forming apparatus. An obtaining unit obtains information related to an error occurred in the image forming apparatus. A display unit displays work required to cancel the error. An input unit causes a user to selectively input contents of work. A control unit stores the contents of work selectively inputted through the input unit in a storage unit when the terminal apparatus stops communicating with the image forming apparatus and transmits the contents of work stored in the storage unit to the image forming apparatus when the terminal apparatus starts communicating with the image forming apparatus.

8 Claims, 15 Drawing Sheets

FIG. 7A

| E339-0004 | | | INFORMATION ON MAIN BODY | | | |
|---|---|---|---|---|---|---|
| JOB ID | REMARKS | RESULT | INFORMATION ON MAIN BODY | | | |
| ID0001 | INSERTION AND REMOVAL OF CONNECTOR J1 | NG | IRC3200 | ADF-A | CONT: Ver1.02 | READER: Ver2.02 |
| ID0002 | INSERTION AND REMOVAL OF CONNECTOR J200 | NG | HISTORY OF PAST ERROR | | | |
| ID0003 | REPLACEMENT OF CONNECTOR J1 | OK | | | | |

FIG. 7B

| E001-0001 | | | INFORMATION ON MAIN BODY | | | |
|---|---|---|---|---|---|---|
| JOB ID | REMARKS | RESULT | INFORMATION ON MAIN BODY | | | |
| ID0005 | REPLACEMENT OF CONNECTOR J300 | NG | IRC3200 | ADF-A | CONT: Ver1.02 | READER: Ver2.02 |
| ID0006 | REPLACEMENT OF FILTER 1 | NG | HISTORY OF PAST ERROR | | | |
| ID0007 | REPLACEMENT OF FAN 2 | OK | | | | |

DISPLAY 1 INITIAL SCREEN

DISPLAY 2 REPAIR ASSISTANCE SCREEN

DISPLAY 3 WORK SELECTION SCREEN 1

DISPLAY 11 WORK SELECTION SCREEN 2

DISPLAY 4 WORK PROCEDURE SCREEN 1

DISPLAY 5 WORK PROCEDURE SCREEN 2

DISPLAY 6 WORK PROCEDURE SCREEN 3

DISPLAY 7 WORK PROCEDURE SCREEN 4

DISPLAY 7 WORK PROCEDURE SCREEN 5

DISPLAY 8 WORK PROCEDURE SCREEN 6

DISPLAY 9 WORK PROCEDURE SCREEN 7

DISPLAY 10 CONFIRMATION SCREEN 1

DISPLAY 12 CONFIRMATION SCREEN 2

TERMINAL APPARATUS AND IMAGE FORMING APPARATUS MAINTENANCE SYSTEM

BACKGROUND OF THE INVENTION

1. Field of the Invention

The present invention relates to a terminal apparatus and a maintenance system for totally performing failure diagnosis and/or maintenance of an image forming apparatus.

2. Description of the Related Art

Errors (abnormality and failure) such as abnormal noise, off-flavor, jam or image defective sometimes occur in an image forming apparatus such as a multi-functions. In that case, a user generally informs a service center for maintaining the image forming apparatus of the status over the phone. A service staff calls at a place where the image forming apparatus is installed to confirm the status and repairs. Reasons for failure and contents of repair works are data-based to improve a working efficiency at the time of repair by referring to data in the database when the same error occurs thereafter.

Hitherto, when a service staff calls at a customer, the service staff replaces a component, surveys an error and performs maintenance while viewing a document such as a service manual prepared on a model-by-model basis. Therefore, when reasons for failure and contents of repair works are data-based, work reports written by service staffs are collected and the service staffs manually identified work history, work content and failure reason.

However, such a method has a problem in that reasons for failure are vaguely identified as a result of implementation of a plurality of simultaneous works by the service staff. There is another problem that only a repair result is recorded without a repair work process to make unclear an actual repair work process. Then, there has been proposed a technique in which an image forming apparatus downloads a self-diagnosis software and automatically transmits a diagnosis result to a server (Japanese Laid-Open Patent Publication (Kokai) No. 11-69063, for example). In addition, there has been proposed a system which automatically performs notification with a power supply turned on (Japanese Laid-Open Patent Publication (Kokai) No. 2006-072967, for example).

The above image forming apparatus can examine the status of the image forming apparatus and transmit diagnostic results to a server when its power supply is turned on, however, the image forming apparatus has a possibility not be able to collect data of contents of work and procedures of repair (for example, connection or disconnection of a bundle wire or replacement thereof) conducted with the power supply turned off.

A main conventional troubleshooting in an image forming apparatus performed at a customer's site includes the replacement of a substrate or a component and the repair of an imperfect-contact portion. These works are done with the power supply of the image forming apparatus turned off.

Therefore, if contents of the work conducted with the power supply turned off are little collected, although the results of self-diagnosis obtained with the power supply turned on are mainly collected, results of analyzing a failure cause using the database have a possibility not reflect an actual failure cause. As a result, even if an order of priority of work procedures is optimized using the database, failures could not be resolved depending on works according to the order of priority. Accordingly, it is desirable to identify the contents of work performed with the power supply turned off.

SUMMARY OF THE INVENTION

The present invention provides a terminal apparatus and an image forming apparatus maintenance system capable of identifying contents of work conducted to repair the image forming apparatus while the power supply of the image forming apparatus is being turned off.

Accordingly, in a first aspect of the present invention, there is provided a terminal apparatus capable of communicating with an image forming apparatus comprising an obtaining unit that obtains information related to an error when the terminal apparatus is communicable with the image forming apparatus if the error occurs in the image forming apparatus, a display unit that displays work required to cancel the error based on the information obtained by the obtaining unit, an input unit that causes a user to selectively input contents of work in accordance with a display on the display unit and a control unit that stores the contents of work selectively inputted through the input unit in a storage unit when the terminal apparatus stops communicating with the image forming apparatus and transmit the contents of work stored in the storage unit to the image forming apparatus when the terminal apparatus starts communicating with the image forming apparatus.

In a second aspect of the present invention, there is provided a terminal apparatus capable of communicating with an image forming apparatus comprising an obtaining unit that obtains information related to an error when the terminal apparatus is communicable with the image forming apparatus if the error occurs in the image forming apparatus, a display unit that displays work required to cancel the error based on the information obtained by the obtaining unit, an input unit that causes a user to selectively input contents of work in accordance with a display on the display unit, a detection unit that detects whether a power supply of the image forming apparatus is turned on or off, and a control unit that stores the contents of work selectively inputted through the input unit in a storage unit when the detection unit detects that the power supply of the image forming apparatus is turned off and transmit the contents of work stored in the storage unit to the image forming apparatus when the detection unit detects that the power supply of the image forming apparatus is turned on.

In a third aspect of the present invention, there is provided an image forming apparatus maintenance system comprising an image forming apparatus, a terminal apparatus capable of communicating with the image forming apparatus and an information processing apparatus connectable to at least one of the image forming apparatus and the terminal apparatus through a communication line, wherein the terminal apparatus comprises an obtaining unit that obtains information related to an error from the image forming apparatus or the information processing apparatus when the terminal apparatus is communicable with the image forming apparatus if the error occurs in the image forming apparatus, a display unit that displays work required to cancel the error based on the information obtained by the obtaining unit, an input unit that causes a user to selectively input contents of work in accordance with a display on the display unit and a control unit that stores the contents of work selectively inputted through the input unit in a storage unit when the terminal apparatus stops communicating with the image forming apparatus and transmits the contents of work stored in the storage unit to the image forming apparatus or information processing apparatus when the terminal apparatus starts communicating with the image forming apparatus.

In a fourth aspect of the present invention, there is provided an image forming apparatus maintenance system comprising an image forming apparatus, a terminal apparatus capable of communicating with the image forming apparatus and an information processing apparatus connectable to at least one of the image forming apparatus and the terminal apparatus through a communication line, wherein the terminal apparatus comprises an obtaining unit that obtains information related to an error from the image forming apparatus or the information processing apparatus when the terminal apparatus is communicable with the image forming apparatus if the error occurs in the image forming apparatus, a display unit that displays work required to cancel the error based on the information obtained by the obtaining unit, an input unit that cause a user to selectively input contents of work in accordance with a display on the display unit, a detection unit that detects whether a power supply of the image forming apparatus is turned on or off and a control unit that stores the contents of work selectively inputted through the input unit in a storage unit when the detection unit detects that the power supply of the image forming apparatus is turned off and transmit the contents of work stored in the storage unit to the image forming apparatus or the information processing apparatus when the detection unit detects that the power supply of the image forming apparatus is turned on.

According to the present invention, it is enabled to identify contents of work conducted to repair the image forming apparatus while the power supply of the image forming apparatus is being turned off.

The features and advantages of the invention will become more apparent from the following detailed description taken in conjunction with the accompanying drawings.

BRIEF DESCRIPTION OF THE DRAWINGS

FIGS. 7A and 7B are examples of work result tables storing contents of work actually performed based on a work procedure displayed on a terminal apparatus and the results thereof, respectively.

Each of FIG. 10A FIG. 10A is a view showing an initial screen and FIG. 10B is a view showing a repair assistance screen.

DETAILED DESCRIPTION OF THE PREFERRED EMBODIMENTS

The present invention will now be described in detail below with reference to the accompanying drawings showing preferred embodiments thereof.

First Embodiment

Figure 1:
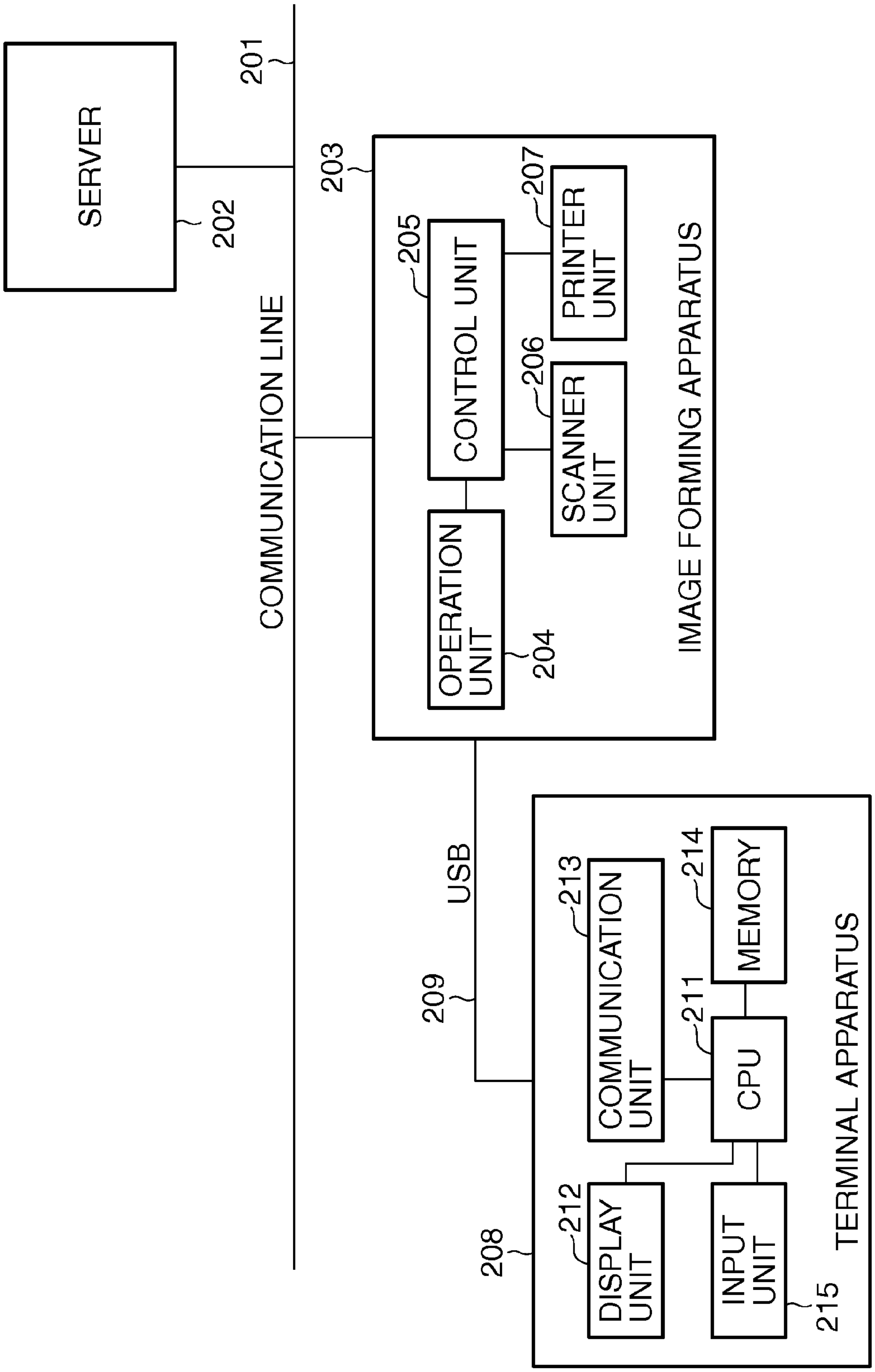
FIG. 1 is a block diagram showing an example of an image forming apparatus maintenance system according to a first embodiment of the present invention.
Figure 2:
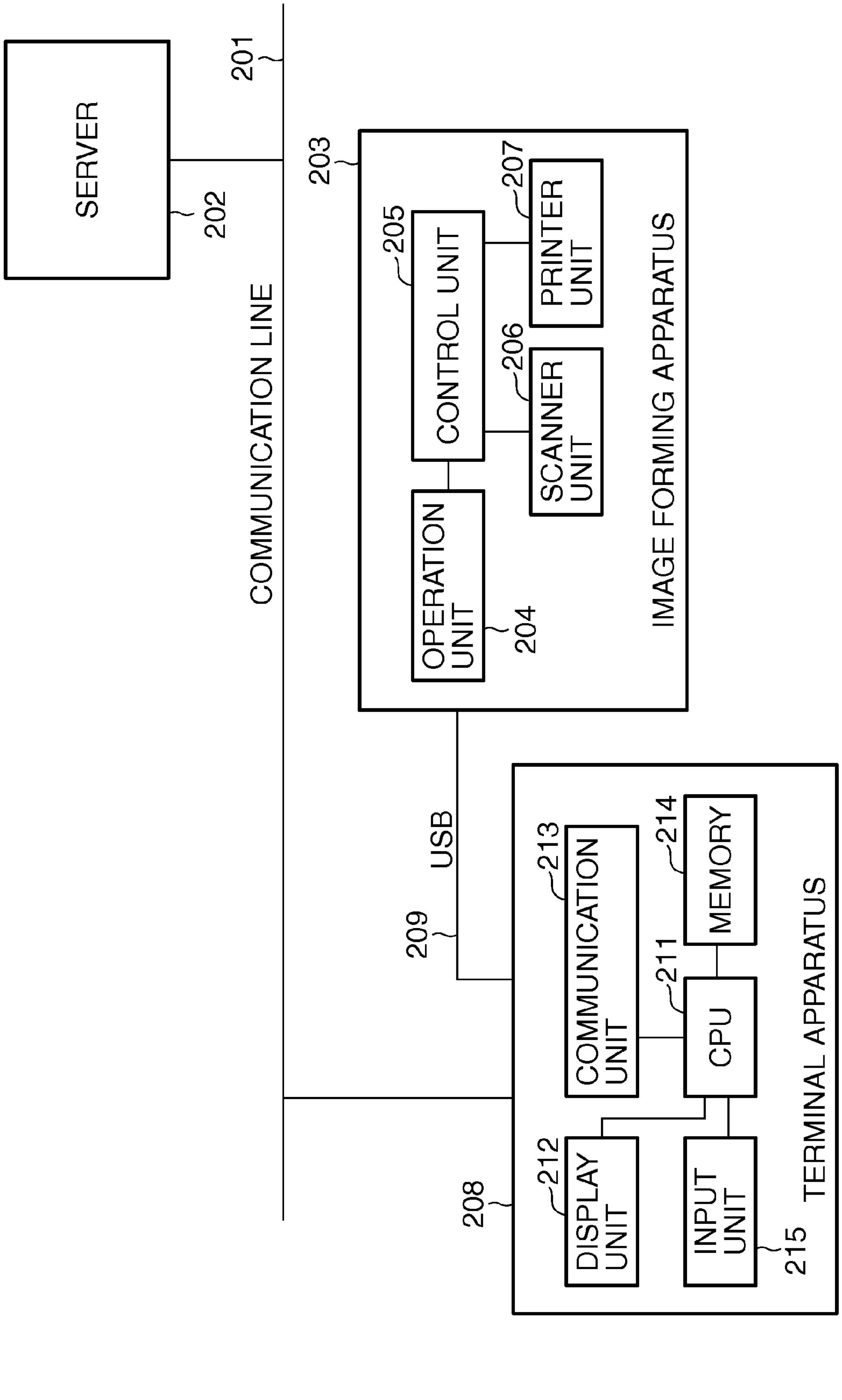
FIG. 2 is a block diagram showing an example of the maintenance system with the image forming apparatus not connected to a communication line.

FIG. 1 is a block diagram showing an example of an image forming apparatus maintenance system according to a first embodiment of the present invention. FIG. 2 is a block diagram showing an example of the maintenance system with the image forming apparatus not connected to a communication line.

In FIG. 1, a server 202 is an information processing apparatus installed in a service center of a corporation or the like, for example. The server 202 is connected to an image forming apparatus 203 through a communication line 201 such as a telephone line or a LAN and controls the image forming apparatus 203. The image forming apparatus 203 is a multi-functions having a plurality of functions of reading and printing an image, for example. Data can be transferred between the server 202 and the image forming apparatus 203 through the communication line 201. When errors such as abnormal noise, off-flavor, jam or image defective occur, the image forming apparatus 203 transmits an error code corresponding to a content of an occurred error to the server 202. The term "error" totally refers to the state where the image forming apparatus 203 does not normally function like when abnormality or failure occurs. It should be noted that an error code sometimes is not given to a specific error.

The server 202 receives an error code from the image forming apparatus 203 to perform a predetermined process. For example, the server 202 outputs information for service support corresponding to the received error code to the image forming apparatus 203. The information for service support includes, for example, contents or procedures of work related to cancellation of an error occurred or troubleshooting. The image forming apparatus 203 temporarily stores a piece of information for service support received from the server 202.

The image forming apparatus 203 is provided with an operation unit 204 of being a user interface, a control unit 205, a scanner unit 206 and a printer unit 207 as main components. The operation unit 204 includes an operation section (not shown) on which a key and a button are arranged and a display section (not shown) that displays information using a liquid crystal display (LCD). The scanner unit 206 causes a lamp of a light source to irradiate an original manuscript with light and captures the reflected light by a CCD line sensor (not shown) to convert it into an electric signal, outputting the converted signal as image data. The printer unit 207 forms an image by an electro-photography method using the after-mentioned photosensitive drum and intermediate transfer belt. The control unit 205 is connected to the operation unit 204, the scanner unit 206 and the printer unit 207 to control these units. The control unit 205 instructs the scanner unit 206 and the printer unit 207 to start an image reading operation and a printing operation, respectively.

The control unit 205 subjects an image data inputted from the scanner unit 206 to various processes such as image processing and outputs the processed image data to the printer unit 207. In addition, the control unit 205 communicates with the server 202 through the communication line 201 to transmit various data such as image data and device information in the image forming apparatus 203 to the server 202 and download information stored in the server.

A terminal apparatus 208 is a mobile information processing terminal. The terminal apparatus 208 is provided with a CPU 211 for control, a display unit 212 that processes display, a communication unit 213 that communicates with the image forming apparatus 203, a memory 214 that stores various data and an input unit 215 used as a user interface.

The display unit 212 is composed of an LCD and others. The communication unit 213 communicates with the image forming apparatus 203 through a wire system using USB or a wireless system using infrared rays. The memory 214 stores information obtained from the image forming apparatus 203 through the communication unit 213 and information inputted by operating the input unit 215. The input unit 215 is composed of a touch panel, a key, or the like. The CPU 211 controls these units.

In the present embodiment, the terminal apparatus 208 is used by a service staff who performs maintenance of the image forming apparatus 203 when an error occurs in the image forming apparatus 203. When the terminal apparatus 208 is connected to the image forming apparatus 203, information for service support in the image forming apparatus 203 is downloaded to the terminal apparatus 208. The downloaded information is displayed on the display unit 212 and guidance (or navigation) is executed.

In the present embodiment, the display unit 212 functions also as the input unit 215. Specifically, the display on the display unit 212 is switched in response to operation input from the display unit 212 during the guidance. It should be noted that a predetermined item can be selected from among various items displayed on the display unit 212 by operating the input unit 215 to execute the operation of the predetermined item.

As shown in FIG. 2, the terminal apparatus 208 can be connected to the communication line 201 through the communication unit 213. When the image forming apparatus 203 cannot be connected to the communication line 201 for some reason or other (for example, in a case where a connection part connected with the communication line 201 fails), the image forming apparatus 203 can communicate with the server 202 through the communication unit 213 of the terminal apparatus 208. Although the present embodiment includes a single image forming apparatus 203, the present embodiment can also include a plurality of image forming apparatuses 203.

Figure 3:
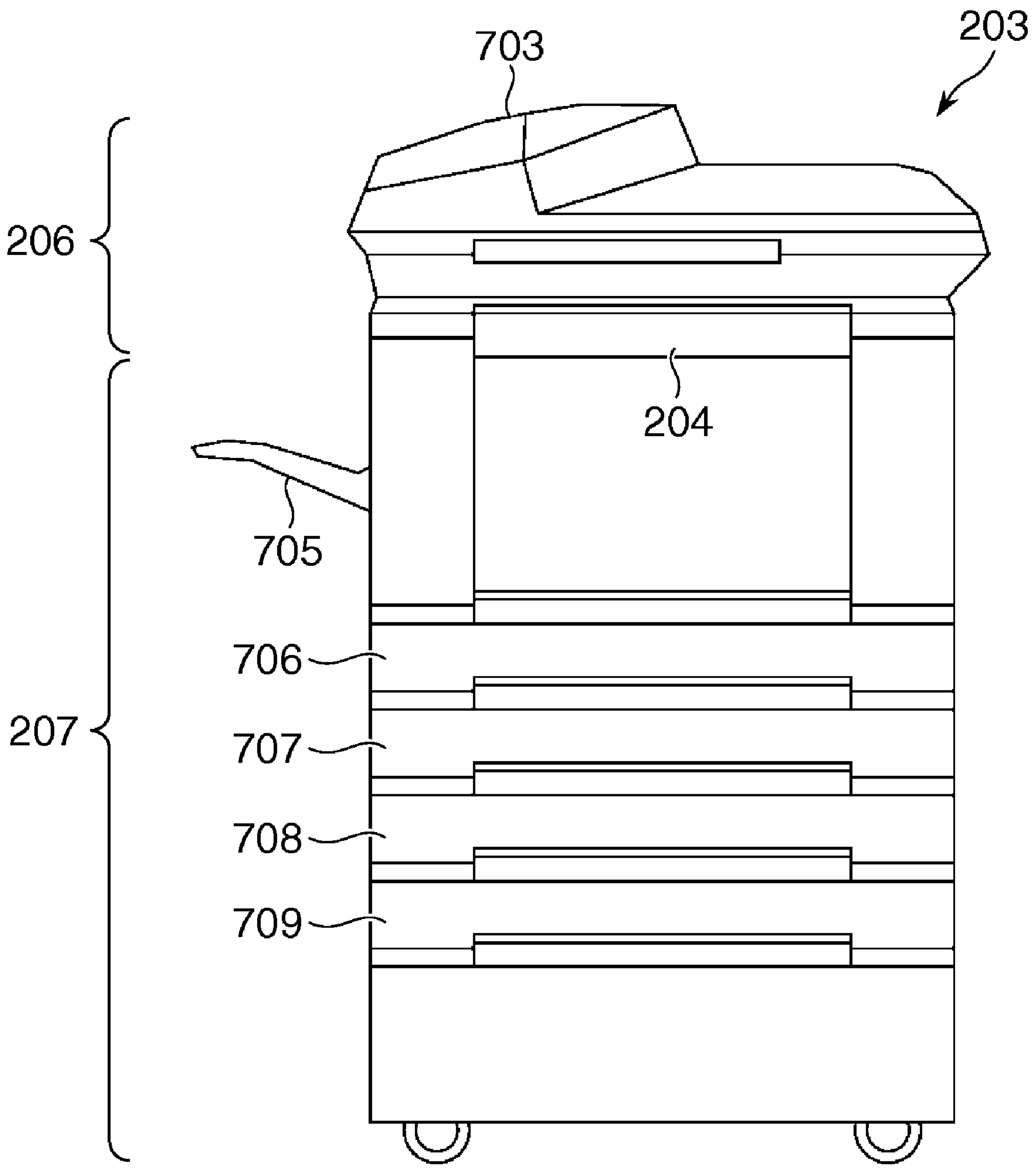
FIG. 3 is a view showing an appearance of the image forming apparatus.

FIG. 3 is a view showing an appearance of the image forming apparatus in FIG. 1.

The image forming apparatus 203 is composed of the scanner unit 206 and the printer unit 207 when externally viewed. The scanner unit 206 is equipped with an automatic document feeding apparatus 703 on which a document to be read is placed. User's issuing of reading instructions through the operation unit 204 causes the automatic document feeding apparatus 703 to feed documents one by one onto a document glass pane described later. The automatic document feeding apparatus 703 controls the separation of documents by a retard method for performing a friction separation. This prevents documents from being erroneously fed due to a duplicate feeding, which enables documents to be fed one by one. The printer unit 207 is equipped with a plurality of paper feeding units 706, 707, 708 and 709 so as to select a desired paper size and a paper orientation. The printer unit 207 is also equipped with a paper ejecting tray 705 onto which an image-formed paper is ejected and stacked.

Figure 4:
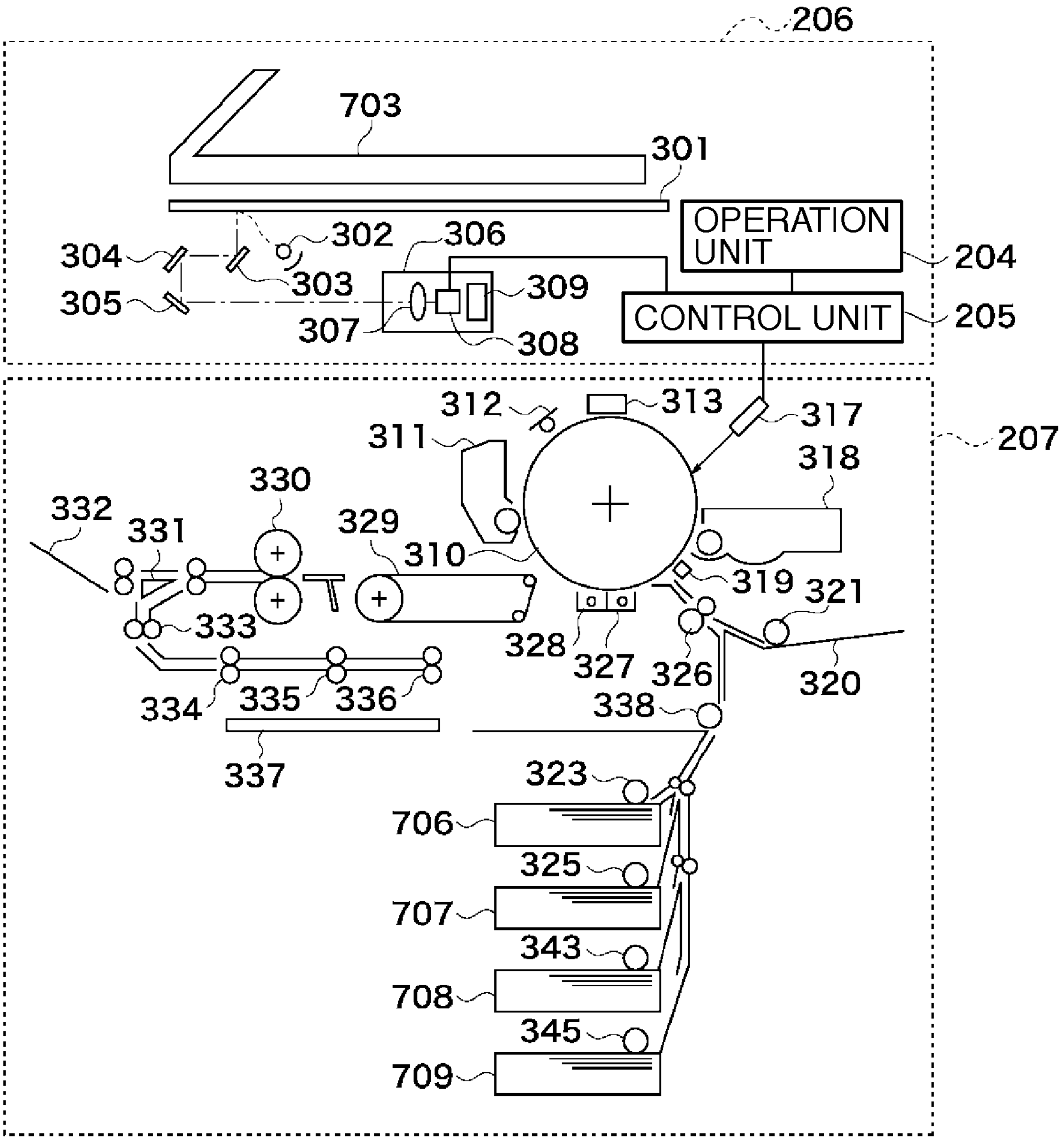
FIG. 4 is a schematic cross section showing a configuration of hardware of the image forming apparatus.

FIG. 4 is a schematic cross section showing a configuration of hardware of the image forming apparatus.

The document is sequentially fed and stacked from the automatic document feeding apparatus 703 to a predetermined position on a document glass pane 301. The document stacked on the document glass pane 301 is exposed under a document illumination lamp 302 formed of a halogen lamp, for example. Scanning mirrors 303, 304 and 305 are housed in an optical scanning unit (not shown). While the optical scanning unit is reciprocally moving, light reflected by the document is led to a CCD unit 306.

The CCD unit 306 is provided with an imaging lens 307 for imaging a reflected light from the optical scanning unit, an imaging device 308 formed of a CCD, for example, and a CCD driver 309 for driving the imaging device 308. The CCD unit 306 converts an image signal which is outputted from the imaging device 308 according to the reflected light image imaged by the imaging lens 307 to digital data of 8 bits, for example, and inputs the digital data to the control unit 205.

An electricity removing lamp 312 removes electricity from a photosensitive drum 310 to prepare for forming an image. A primary charging unit 313 uniformly charges the photosensitive drum 310. An exposure apparatus 317 is formed of a semiconductor laser, for example, and exposes the photosensitive drum 310 based on image data processed by the control unit 205 to form an electrostatic latent image.

A black developer (toner) is housed in a developer 318. A pre-transfer charging unit 319 applies high voltage to the photosensitive drum 310 before a toner image developed on the photosensitive drum 310 is transferred on a paper. The paper feeding units 706, 707, 708 and 709 and a manual paper feeding unit 320 hold papers respectively.

Each of paper feeding rollers 321, 323, 325, 343 and 345 is driven to feed a sheet of paper from a predetermined paper feeding equipped with unit to the inside of the apparatus. The fed paper temporarily stops at a position where a registration roller 326 is disposed and resumes being fed at a writing timing of an image formed on the photosensitive drum 310. At this point, a retard roller is controlled based on the known friction-separation method to separate the paper one by one without the paper being duplicately fed, whereby the paper is fed and transported. The rotation of the retard roller can be controlled to transport the paper with the separation control of the paper stopped.

A transfer charging unit 327 transfers a toner image developed on the photosensitive drum 310 to the fed paper. A separation charging unit 328 separates the paper to which the toner image is transferred from the photosensitive drum 310. The toner remaining on the photosensitive drum 310 without being transferred to the paper is recovered by a cleaner 311. A conveying belt 329 conveys the paper subjected to the transfer process to a fixing unit 330. The fixing unit 330 fixes the toner image transferred to the paper by heat, for example.

Figure 5:
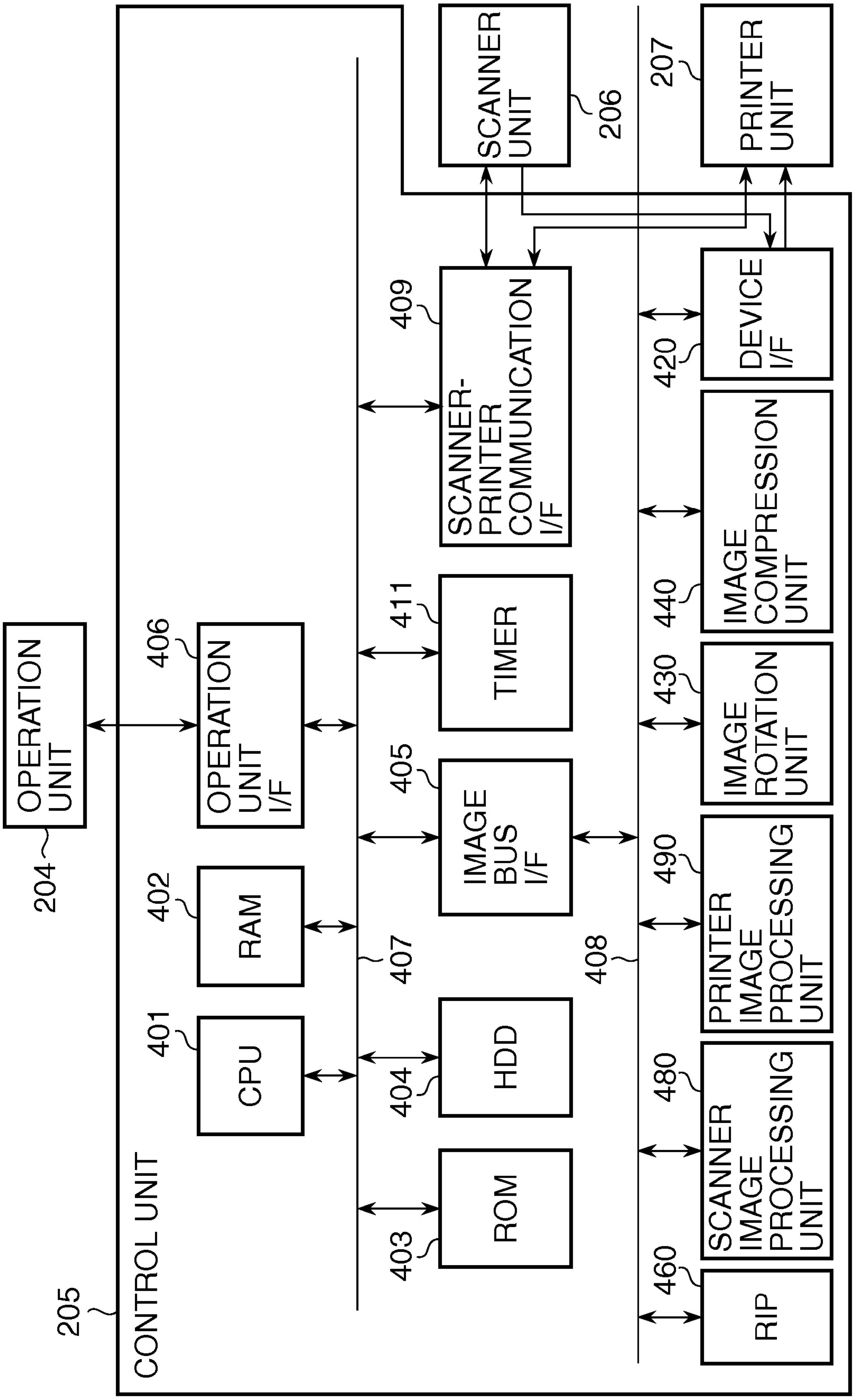
FIG. 5 is a block diagram showing the configuration of the control unit.

A flapper 331 switches a conveyance path for the paper subjected to the fixing process by the fixing unit 330 to a direction of either a sorter 332 or an intermediate tray 337. Feeding rollers 333 to 336 feeds the paper subjected to the fixing process to an intermediate tray 337 with the paper reversed (multiplex) or non-reversed (double faced). A refeeding roller 338 conveys the paper placed on the intermediate tray 337 to the position where the registration roller 326 is disposed FIG. 5 is a block diagram showing the configuration of the control unit.

A CPU 401 controls the entire system of the image forming apparatus 203. A RAM 402 is composed of a high-speed writable volatile device such as a SDRAM and a SRAM. The SDRAM is used as a system work memory for operating the CPU 401 and as an image memory for temporarily storing image data. When the SRAM is used, the SRAM is backed up by a backup battery (not shown) and used to store user setting such as log level on log information related to operating status of the system.

A ROM 403 is a boot ROM composed of a rewritable flash ROM and stores therein boot programs and settings for the system. An HDD 404 is a hard disk drive and stores therein system software, application software, image data and log information.

An operation unit I/F 406 is connected to the operation unit 204 to output image data to be displayed on the operation unit 204 to the operation unit 204. The operation unit I/F 406 plays a part in informing the CPU 401 of information inputted by a user through the operation unit 204. A scanner-printer communication I/F 409 is an interface for communicating with each of the scanner unit 206 and the printer unit 207. A timer 411 functions as a timer for setting time of the image forming apparatus 203 or the control unit 205 and generating interrupt at a constant time period. The above devices are arranged on a system bus 407.

An image bus I/F 405 is a bus bridge connecting the system bus 407 and an image bus 408 which transfers image data at a high speed to convert data structure. The image bus 408 is composed of a PCI bus or an IEEE 1334. The following devices are arranged on the image bus 408.

Between the scanner unit 206 and the printer unit 207, a device I/F 420 converts mutually image data between synchronous system and asynchronous system. A scanner image processing unit 480 subjects an inputted image data to correction, process and edition. A printer image processing unit 490 corrects the image data to be outputted and converts the resolution thereof. An image rotation unit 430 rotates the image data. An image compression unit 440 subjects the image data to compression and expansion processing and converts, for example, multi-level image data to JPEC and binary image data to JBIG, MMR and MH, respectively.

The operation and control of the entire image forming apparatus 203 is realized by loading the system software stored in the HDD 404 into the RAM 402 and the CPU 401 executing the software. Operation status is stored as log information in the RAM 402 and the HDD 404. The stored log information is compiled in various memories in the operation unit 204 and a memory (not shown) in the control unit 205 or outputted by the printer unit 207.

Figure 6:
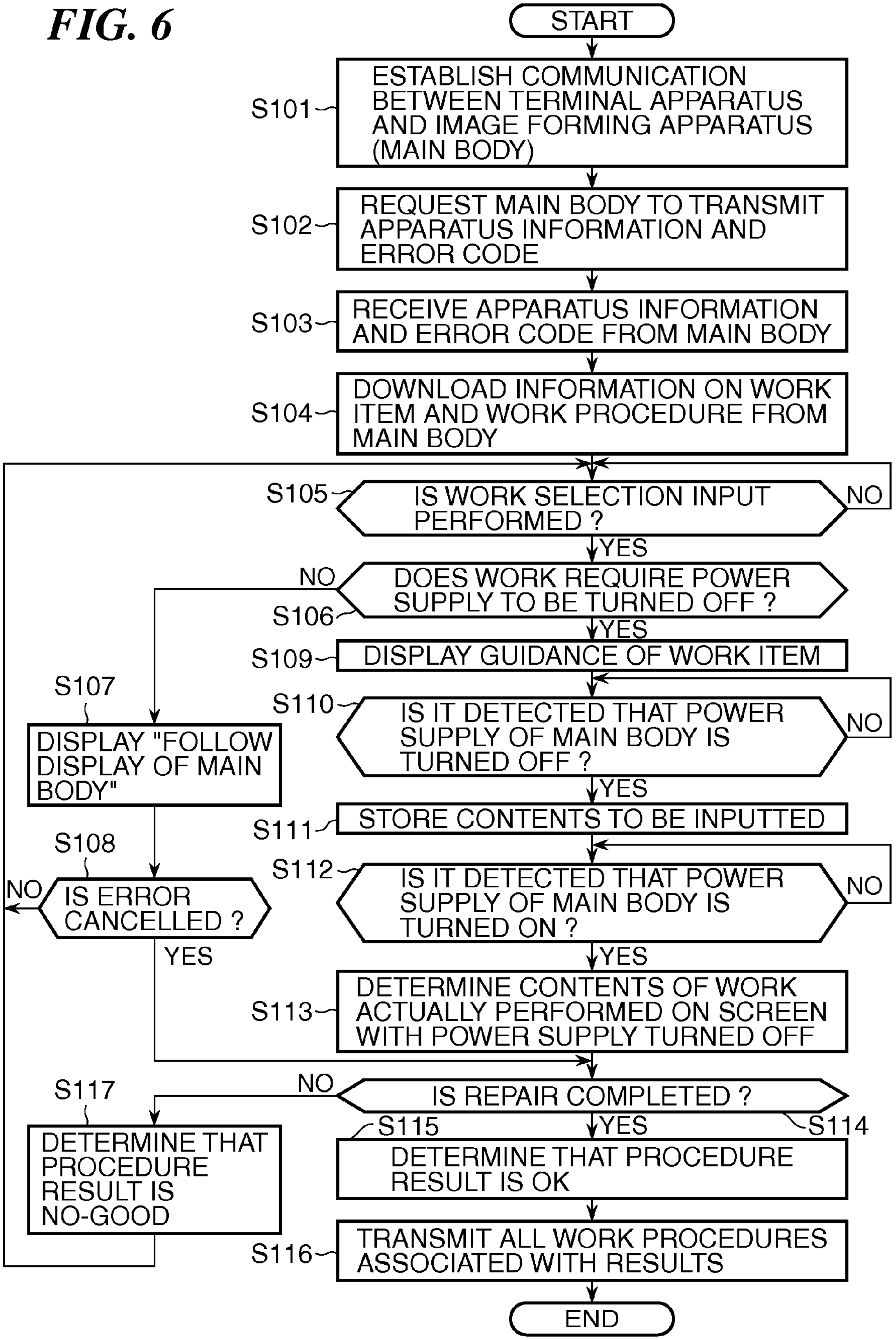
FIG. 6 is a flow chart showing a flow of operation executed in a case where an error occurs in the image forming apparatus of the maintenance system.

FIG. 6 is a flow chart showing a flow of operation executed in a case where an error occurs in the image forming apparatus of the system in FIG. 1. Although the operation processing described below is performed by the CPU 401 in the image forming apparatus 203 and the CPU 211 in the terminal apparatus 208 executing a control program, for the sake of convenience, the image forming apparatus 203 and the terminal apparatus 208 are regarded as executing the control program.

When an error occurs in the image forming apparatus 203, the image forming apparatus 203 displays the occurrence of the error on the display section of the operation unit 204. The image forming apparatus 203 transmits an error code indicating the contents of the error occurred as information for maintenance support to the server 202 through a communication line 201. At this point, the image forming apparatus 203 transmits information on the time the error occurred, work history, the configuration of the image forming apparatus and a version number of software along with the error code. The image forming apparatus 203 can transmit jam information and information on a service call inputted by a user through the operation unit 204.

Figure 10A:
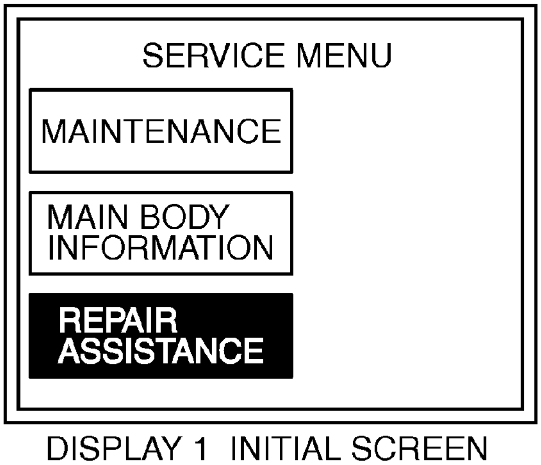

A service staff connects the image forming apparatus 203 being the main body with the terminal apparatus 208 and turns on the power supply of the terminal apparatus 208. Thereby, communication is established between the terminal apparatus 208 and the image forming apparatus 203 to make them communicable (step S101). In this state, an initial screen (service menu screen) is displayed on the display unit 212 of the terminal apparatus 208. FIG. 10A is a view showing one example of an initial screen displayed on the terminal apparatus.

On "Display 1, Initial Screen" in FIG. 10A, there are displayed a "maintenance" button for displaying maintenance information and a "main-body information" button for displaying the configuration of the image forming apparatus 203 and the version information of software. In addition, there is displayed a "repair assistance" button for guiding the service staff to repair an error. The service staff selects a desired menu from "Display 1". The buttons displayed on "Display 1" in FIG. 10A are shown as an example. Buttons for indicating other pieces of information can be displayed.

When the "repair assistance" button is selected on "Display 1", the terminal apparatus 208 requests the image forming apparatus 203 to transmit the error code and the apparatus information of the image forming apparatus 203 (step S102). It should be noted that the terminal apparatus 208 can request the image forming apparatus 203 when communication is established or "Display 1" is displayed. The apparatus information of the image forming apparatus 203 includes information on the time the error occurred, work history, the configuration of the image forming apparatus 203 and the version number of software.

Figure 10B:
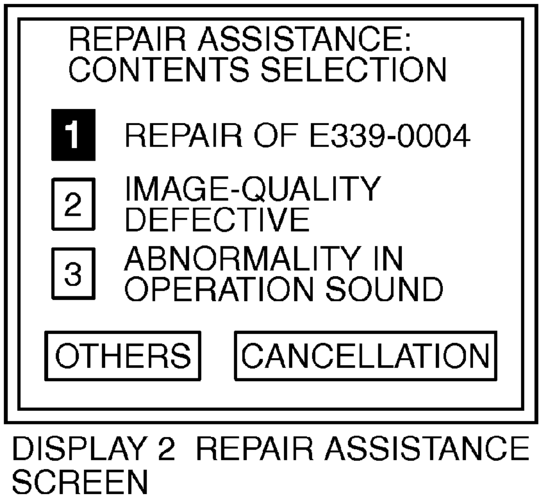
FIG. 10B is a view showing an example of a screen displayed on the terminal apparatus.

When the terminal apparatus 208 receives the apparatus information of the image forming apparatus 203 and the error code requested in step S102 (step S103), the terminal apparatus 208 switches "Display 1" to a repair assistance screen. FIG. 10B is a view showing an example of the repair assistance screen displayed on the terminal apparatus.

On "Display 2, Repair Assistance Screen" in FIG. 10B, there are displayed a button for canceling the error (repairing) occurred in the image forming apparatus 203 and a button for performing guidance for an error other than errors such as image-quality defective and an abnormality in operation sound. In FIG. 10B, for example, it is possible to select "repair of E339-0004" corresponding to Error code: E339-0004. The service staff's selecting the button causes the terminal apparatus 208 to request the image forming apparatus 203 to start a repair job.

The image forming apparatus 203 outputs work information (work item information and work procedure information) related to the error occurred to the terminal apparatus 208 in response to the request for the start of the repair job. In this case, the image forming apparatus 203 can download necessary work information from the server 202 to output it to the terminal apparatus 208. For example, even if the error code is the same, priority of repair procedure sometimes varies with models, environments and configurations, so that the use of the latter configuration enables the service staff to obtain information reflecting an optimum repair procedure.

Figure 11A:
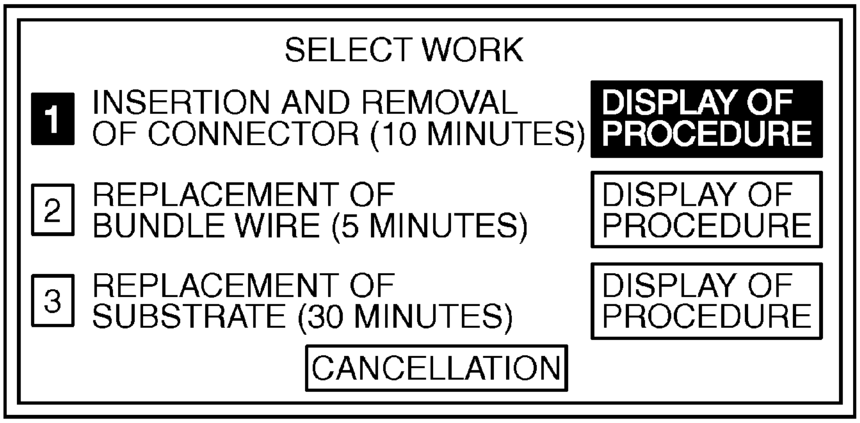
FIGS. 11A and 11B are views showing examples of work selection screens displayed on the terminal apparatus, respectively.
Figure 11B:
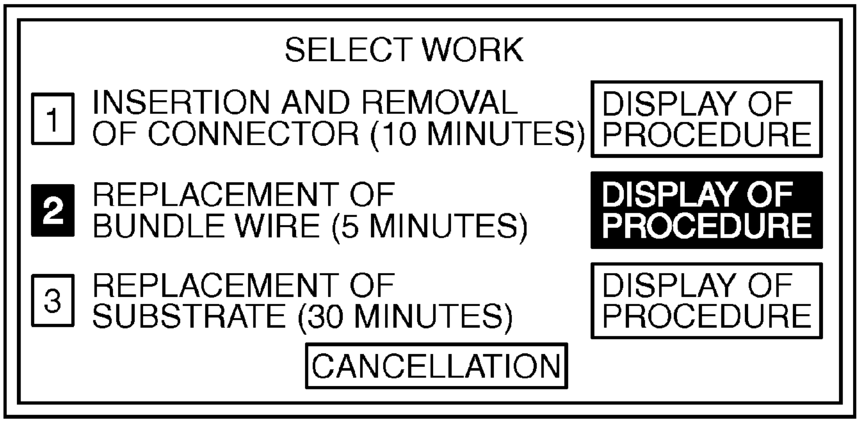

The terminal apparatus 208 downloads (obtains) the work information corresponding to the error code from the image forming apparatus 203 and stores it in the memory 214 (step S104). Then, the terminal apparatus 208 displays a work selection screen on the display unit 212 based on work information stored in the memory 214. FIGS. 11A and 11B are views showing examples of a work selection screens displayed on the terminal apparatus, respectively.

On "Display 3, Work Selection Screen (1)" shown in FIG. 11A, there are displayed, for example, a plurality of work items for canceling the error occurred in the image forming apparatus 203. The work items can be arranged in descending order of simplicity in work procedure and in descending order of the probability that the repair is completed. In the latter case, it is desirable that the work items determined based on the data base in the server 202 are reflected in the display. If the error can be regarded as occurring due to a single factor, a single work item can be selected. The work item to be displayed can be limited to only a single work item, more specifically, only "1: Connector Insertion and Removal" or only "1" shown in FIG. 11A.

When the service staff selects a work item on the screen "display 3" in FIG. 11A to input, the terminal apparatus 208 transmits, to the image forming apparatus 203, a piece of work selection information inquiring whether the power supply of the image forming apparatus 203 needs to be turned off for the selected work (step S105). For example, when "1: Connector Insertion and Removal" is selected and inputted on the screen of the display 3, the terminal apparatus 208 transmits the selected work item to the image forming apparatus 203 and inquires of the image forming apparatus 203 whether the work can be done with the power supply of the image forming apparatus 203 turned on.

The terminal apparatus 208 receives information indicating whether the power supply of the image forming apparatus 203 needs to be turned off (information on necessity to turn off the power supply) from the image forming apparatus 203 as a response to the transmitted work selection information. When the selected work can be done with the power supply of the image forming apparatus 203 turned on (NO, in step S106), the process proceeds to step S107. For example, when an error can be canceled by repair such as adjusting or setting, a repair work can be done with the power supply of the image forming apparatus 203 turned on.

In step S107, the terminal apparatus 208 displays a message (for example, "work in accordance with a display on the main body") on the operation unit 204 of the image forming apparatus 203 to urge the service staff to follow the displayed instruction. Thereafter, a determination is made as to whether the error is cancelled by the work of the service staff (step S108). When the error is cancelled (YES, in step S108), then, a determination is made as to whether a repair is completed (step S114). When it is determined that the repair is completed (YES, step S114), the process is ended through steps S115 and S116. On the other hand, if the error cannot be cancelled (NO, in step S108), the process returns to step S105. It should be noted that the contents processed in steps S115 and S116 are described in detail later.

Figure 12A:
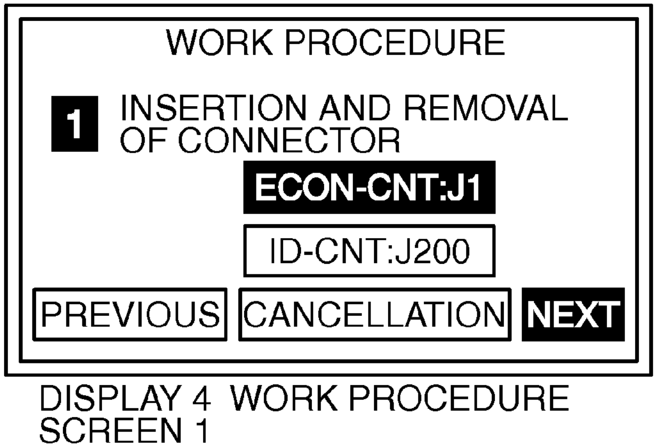
FIGS. 12A to 12G are views showing examples of work-procedure screens displayed on the terminal apparatus, respectively.
Figure 12B:
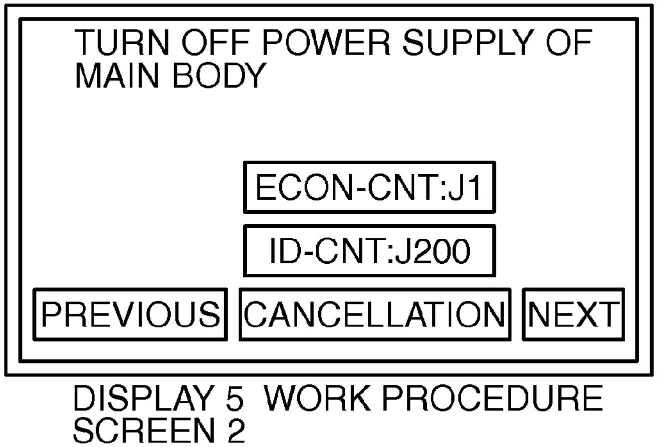

When the selected work in step S105 cannot be done with the power supply of the image forming apparatus 203 turned on (YES, in step S106), the terminal apparatus 208 displays work guidance based on the work information stored in the memory 214 (step S109). FIGS. 12A to 12G are views showing examples of screens for work procedures displayed on the terminal apparatus, respectively. For example, "Display 4, Work Procedure Screen (1)" shown in FIG. 12A is displayed on the display unit 212. The "Display 4" in FIG. 12A is a screen indicating a work procedure in a case where "1: Connector Insertion and Removal" in "Display 3" in FIG. 11A is selected and displays a location where can be a cause of the error.

The screen of the "Display 4" in FIG. 12A displays to instruct the service staff to insert and remove a connector J1 because imperfect contact of the connector J1 connecting between ECON and CNT (controller substrate) probably causes the error. When the service staff selects to insert and remove the connector J1 in accordance with the instruction and depresses a "next" button, the display of the display unit 212 is switched to the screen of "Display 5, Work Procedure Screen (2)" shown in FIG. 12B. The "Display 5" instructs the service staff to turn off the power supply of the image forming apparatus 203. The terminal apparatus 208 waits until the power supply of the image forming apparatus 203 is turned off (step S110).

Figure 12C:
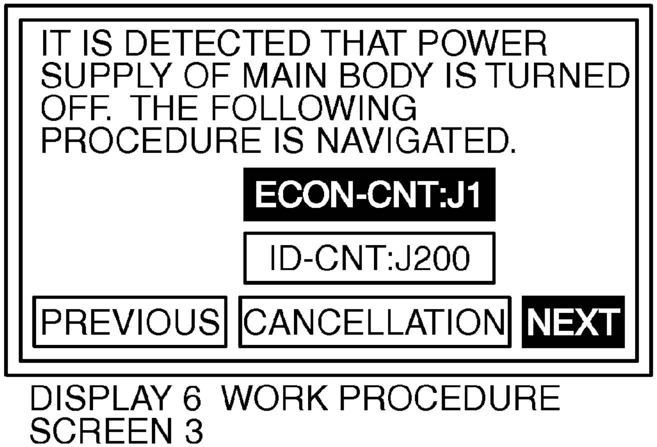

When the terminal apparatus 208 detects that the power supply of the image forming apparatus 203 is turned off (YES, in step S110), the terminal apparatus 208 replaces "Display 5" with "Display 6, Work Procedure Screen (3)" shown in FIG. 12C to display it on the display unit 212.

The terminal apparatus 208, for example, polls the image forming apparatus 203. When there is no response to the polling, the terminal apparatus 208 determines that the power supply of the image forming apparatus 203 is turned off. The present invention is not limited to that. A method of monitoring a power supply ready signal can be used to detect that the power supply of the image forming apparatus 203 is turned off. Other methods can be used.

Figure 12D:
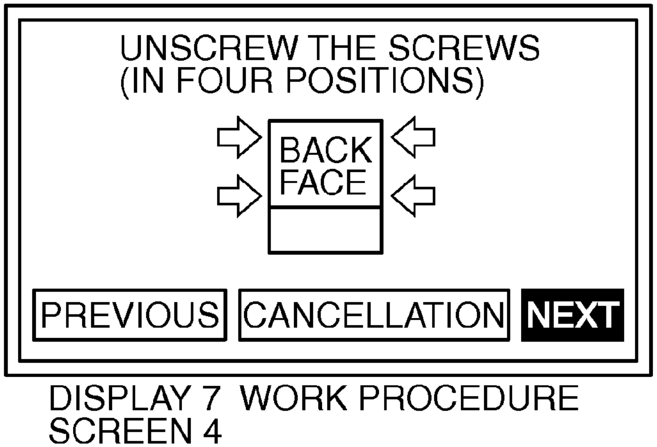
Figure 12E:
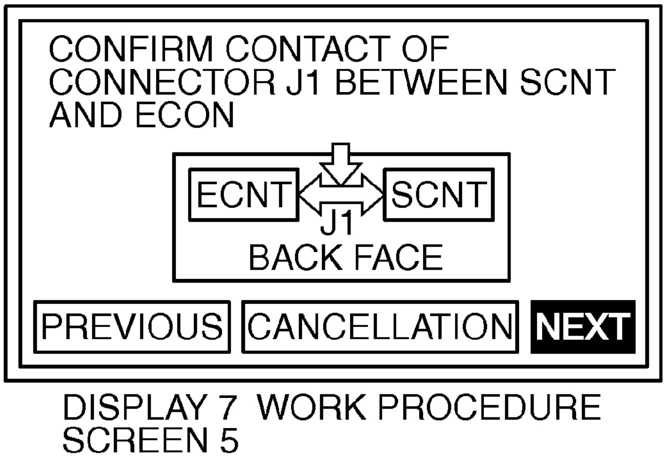

When the "Display 6" is displayed on the display unit 212 of the terminal apparatus 208 and then, a "next" button is depressed, the "Display 6" is switched to a "Display 7, Work Procedure Screen (4)" shown in FIG. 12D or "Display 7, Work Procedure Screen (5)" shown in FIG. 12E.

The "Display 7" is a screen for guiding a work procedure to cancel an error after the power supply of the image forming apparatus 203 is turned off. The "Display 7" displays a work procedure for inserting and removing the connector J1. The "Work Procedure Screen (4)" displays a place where a screw is removed to insert and remove the connector J1. The "Work Procedure Screen (5)" displays the arrangement of the connector J1. It should be noted that the "Display 7" can display a detailed work procedure irrespective of the examples of FIGS. 12D and 12E.

When the power supply of the image forming apparatus 203 is turned off, the terminal apparatus 208 sequentially stores information inputted through the input unit 215 and information pertaining to the selection of the button displayed on the display unit 212 in the memory 214 (step S111). The information stored in the memory 214 includes the contents of work performed by the service staff, for example, "removal and insertion of connector J1." When the power supply of the image forming apparatus 203 is turned off, the image forming apparatus 203 cannot store the contents of work for the image forming apparatus 203 performed by the service staff. For example, the service staff's selection of "ECON-CNT:J1" at the time of displaying "Display 6" on the display unit 212 of the terminal apparatus 208 is regarded as the contents of work performed by the service staff when the power supply of the image forming apparatus 203 is turned off. The contents of the work are stored as information "removal and insertion of connector J1" in the memory 214. Thus, the contents of the work performed by the service staff can be recorded (stored) even if the power supply of the image forming apparatus 203 is turned off.

Figure 12F:
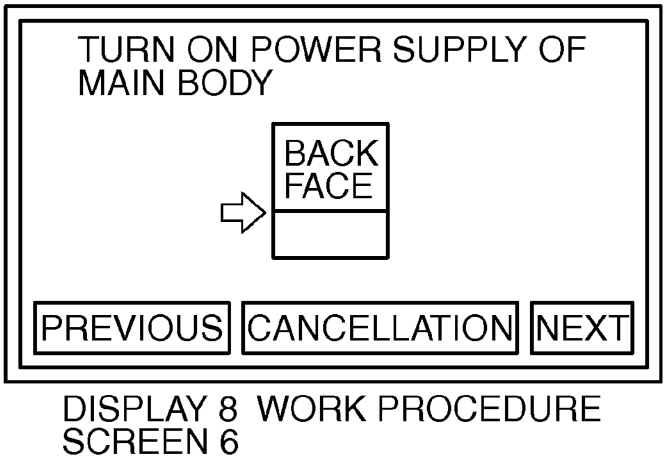
Figure 12G:
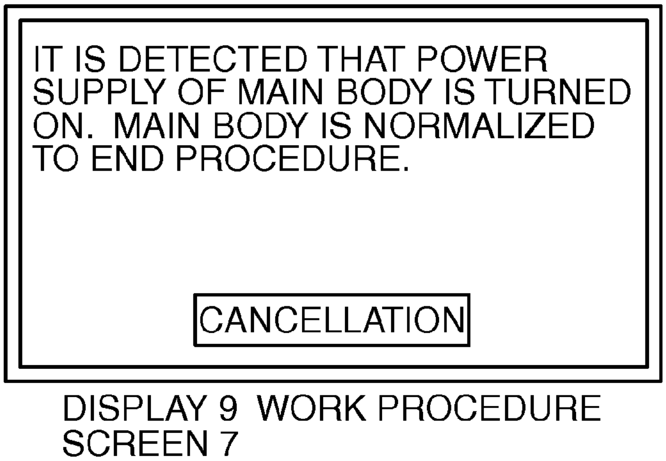

When the display of a series of work procedures along with the progress of work performed by the service staff is finished, the terminal apparatus 208 displays "Display 8, Work Procedure Screen (6)" shown in FIG. 12F on the display unit 212. The "Display 8" is a screen for guidance instructing the service staff to turn on the power supply of the image forming apparatus 203. Subsequently, the terminal apparatus 208 polls the image forming apparatus 203 to detect whether the power supply of the image forming apparatus 203 is turned on (step S112). When the terminal apparatus 208 detects that the power supply of the image forming apparatus 203 is turned on, the terminal apparatus 208 displays "Display 9, Work Procedure Screen (7)" shown in FIG. 12G on the display unit 212. Furthermore, when the terminal apparatus 208 detects that the power supply of the image forming apparatus 203 is turned on, the terminal apparatus 208 establishes communication with the image forming apparatus 203.

In step S113, the terminal apparatus 208 determines the information stored in the memory 214 in step S111 as the contents of the work performed with the power supply of the image forming apparatus 203 turned off. It should be noted that a determining button (not shown) for determining the contents of the work performed by the service staff can be provided on the input unit 215 to increase reliability of the contents of the work actually performed. The terminal apparatus 208 stores a work result table in which job IDs, the contents of the work and the work result are associated with one another in the memory 214. FIGS. 7A and 7B are views showing examples of work result tables.

The work result table contains at least an error code, a job ID, contents of work and the result of the work. In addition to the above information, it is preferable to add apparatus information on the image forming apparatus 203, such as apparatus configuration, version information of software and work history. The contents of work are stored in remarks column of the work result table. The job ID can be allocated to each selected work item. Whatever can identify the contents of work can be available as the job ID.

After the process in step S113, the terminal apparatus 208 checks if the error code occurs after the power supply of the image forming apparatus 203 is turned on to determine whether the repair is completed (step S114). If the terminal apparatus 208 cannot check if the error code occurs due to poor communication, the terminal apparatus 208 can automatically determine that the repair is not yet completed. Alternatively, the service staff can determine whether the repair is completed based on the display on the display section of the operation unit 204 with the power supply of the image forming apparatus 203 turned on. A high voltage error can be checked by a printing operation. In this case, guidance can be displayed on the display unit 212 of the terminal apparatus 208 or the operation unit 204 of the image forming apparatus 203.

Figure 13A:
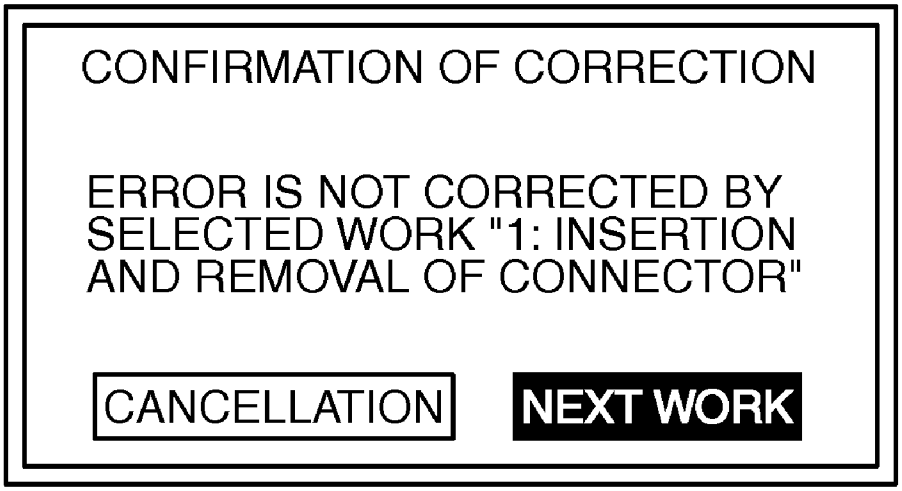
FIGS. 13A and 13B are views showing examples of confirmation screens displayed on the terminal apparatus, respectively.
Figure 13B:
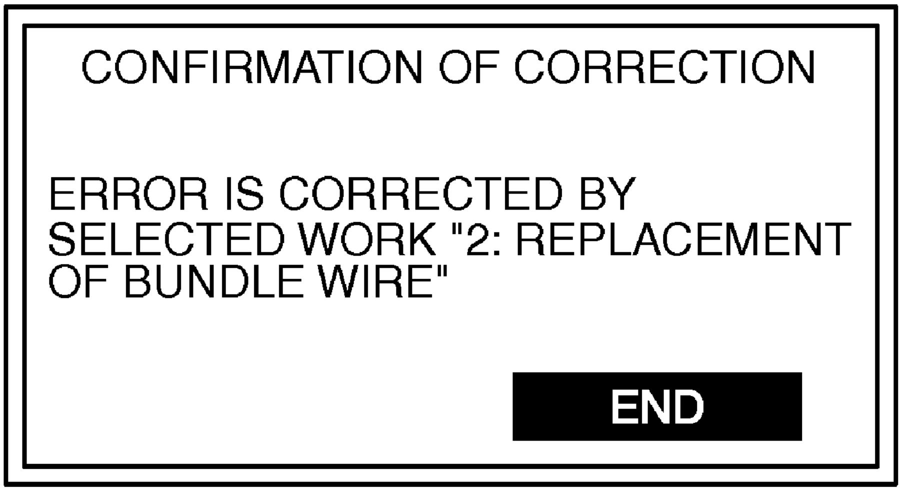

In step S114, when the terminal apparatus 208 determines that an error code occurs again and a repair is not yet completed (NO, in step S114), the terminal apparatus 208 determines that the work result is NO-GOOD (step S117) and displays a confirmation screen on the display unit 212 (step S117). FIGS. 13A and 13B are views showing examples of confirmation screens, respectively. A "Display 10, Confirmation Screen (1)" in FIG. 13A shows that the error is not cancelled notwithstanding the service staff inserts and removes the connector.

In step S117, the terminal apparatus 208 adds the work result to a result column in the work result table. Thereafter, the processes in step S105 to S114 are repeated.

When the error is not cancelled, another work item can be selected.

When it is determined as "YES" in step S114, the process proceeds to step S115. For example, suppose that "2: replacement of bundle wire" in a "Display 11, Work Selection Screen (2)" in FIG. 11B is selected and, as a result of the work (replacement of bundle wire), the error is cancelled to complete the repair. In this case, in step S115, the terminal apparatus 208 displays a "Display 12, Confirmation Screen (2)" shown in FIG. 13B on the display unit 212. The "Display 12" is a screen indicating that the repair is completed by the work performed with the power supply of the image forming apparatus 203 turned off. Even when the repair is completed by inserting and removing the connector, as is the case with the "Display 12", there is displayed a screen indicating that the repair is completed by inserting and removing the connector. Even if it is unnecessary to turn off the power supply of the image forming apparatus 203, the same display is executed when the repair is completed.

For the contents shown in the "Display 12", the error occurred in the image forming apparatus 203 is regarded as having been canceled by "replacement of bundle wire" to identify a bundle-wire defective as a cause of failure and the procedure result being OK is stored in the result column of the work result table. When the connectors 41 and J200 (refer to FIG. 12A) are inserted and removed in parallel, two work items per one job ID can be stored in the remarks column.

After the process in step S115, the terminal apparatus 208 transmits the work result table stored in the memory 214 to the image forming apparatus 203 (step S116) and thus the process terminated. After that, the image forming apparatus 203 transmits the work result table to the server 202. The server 202 collects causes of occurrence of the error from the received work result table and enters them into the database. The server 202 changes a method of displaying work items required for canceling the error based on the database. This enables to display the items of the "Display 3" in FIG. 11A and the "Display 4" in FIG. 12A in descending order of repairable probability to improve the efficiency of the work performed by the service staff.

The above present embodiment has been described in that the contents of the work performed by the service staff and the result of the work are complied as the work result table in the terminal apparatus 208 and then, transmitted to the image forming apparatus 203. However, the present invention is not limited to the above embodiment, the terminal apparatus 208 can transmit information to the image forming apparatus 203 as required when the power supply of the image forming apparatus 203 is turned on and the control unit 205 can control the work result table.

As shown in FIG. 2, the image forming apparatus 203 is sometimes not connected to the communication line 201 and communicates with the server 202 through the terminal apparatus 208. In this case, in step S104, the terminal apparatus 208 can download predetermined information from the server 202 and, in step S117, the terminal apparatus 208 can transmit the predetermined information to the server 202.

As shown in the "Display 8" in FIG. 12F, the contents of the work actually performed in step S113 can be determined only if the power supply of the image forming apparatus 203 is turned on when the work proceeds to the final guidance screen of each work item. The power supply of the image forming apparatus 203 can be turned on or off by remote control based on information inputted to the input unit 215 of the terminal apparatus 208. In this case, for example, a remote power-supply ON button (not shown) can be provided on the input unit 215 to determine the contents of the work performed in step S111 when the button is depressed.

The flow of communication among the terminal apparatus 208, the image forming apparatus 203 and the server 202 in the processes described referring to FIG. 6 is described with reference to FIGS. 8 and 9.

Figure 8:
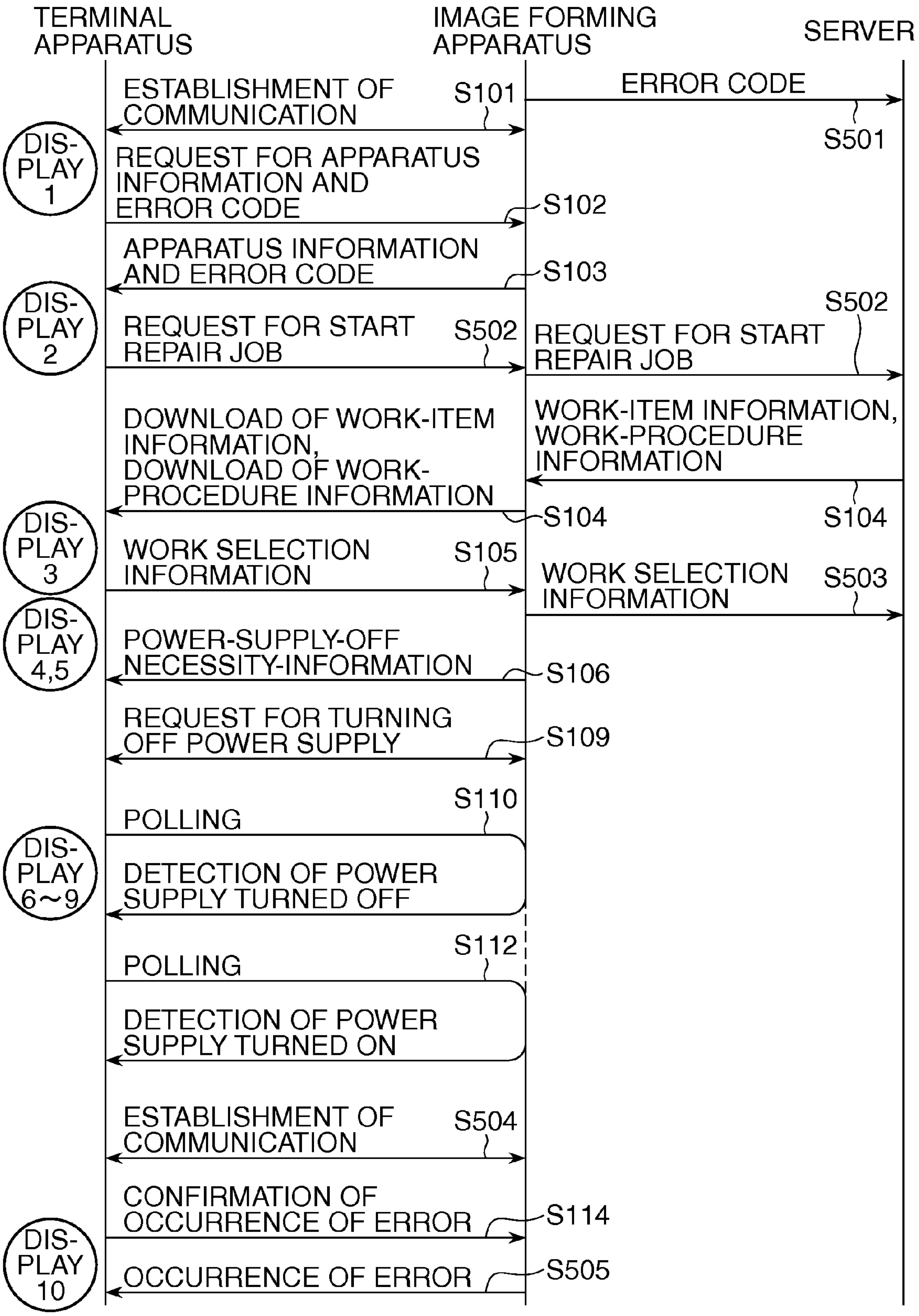
FIG. 8 is a chart showing a flow of communication among the apparatuses in a case where an error occurs in the image forming apparatus.
Figure 9:
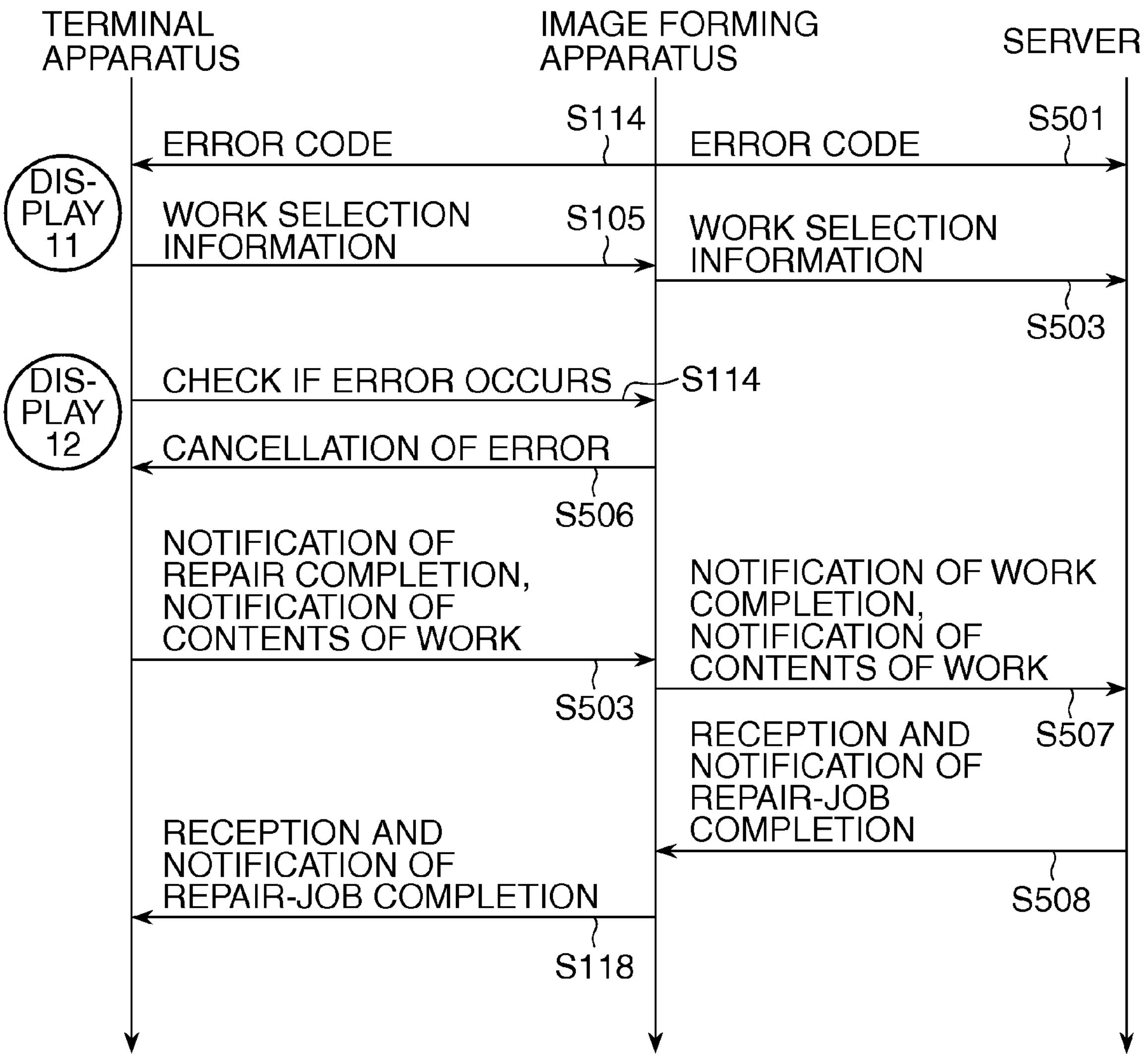
FIG. 9 is a chart continuing from the chart of FIG. 8.

FIGS. 8 and 9 are charts showing the flow of communication among the apparatuses in a case where an error occurs in the image forming apparatus. FIG. 9 is a chart continuing from the chart of FIG. 8. In the figures, the steps being the same as those in FIG. 6 are given the same reference characters and numerals and the screen numbers ("Display 1" to "Display 12") displayed on the terminal apparatus 208 are given.

As shown in FIG. 8, the image forming apparatus 203 transmits an error code to the server 202 when an error occurs in the image forming apparatus 203 (step S501).

A service staff arrives at a site where the image forming apparatus 203 is installed and connects the terminal apparatus 208 to the image forming apparatus 203 to establish communication between the apparatuses (step S101) If the "repair assistance" button is selected on the screen "Display 1" displayed on the display unit 212 of the terminal apparatus 208, the terminal apparatus 208 transmits a signal requesting the image forming apparatus 203 to transmit the apparatus information of the image forming apparatus 203 and the error code to the image forming apparatus 203 (step S102). The image forming apparatus 203 transmits the apparatus information and the error code to the terminal apparatus 208 immediately after receiving the request signal (step S103).

When the "repair of [error code]" is selected on the screen "Display 2" displayed on the display unit 212, the terminal apparatus 208 requests the image forming apparatus 203 to start a repair job. In response to the request, the image forming apparatus 203 requests the server 202 to start the repair job (step S502). The server 202 transmits work information related to cancellation of the error to the terminal apparatus 208 immediately after receiving the request for the start of the repair job (step S104).

When a work item Y ("Y" is "1: Connector Insertion and Removal", for example) is selected on the screen "Display 3" displayed on the terminal apparatus 208, the terminal apparatus 208 transmits work selection information to the image forming apparatus 203 (step S105). The image forming apparatus 203 determines, based on the work selection information, whether the power supply of the image forming apparatus 203 needs to be turned off in accordance with the contents of the selected work. Further, the image forming apparatus 203 transmits the determination result as a power-supply-off necessity-information to the terminal apparatus 208 (step S106). At this point, the image forming apparatus 203 can inform the server 202 of the item selected by the service staff as the work selection information (step S503).

The terminal apparatus 208 uses polling to detect whether the power supply of the image forming apparatus 203 is turned off (step S110). While the power supply of the image forming apparatus 203 is being turned off, work is performed in accordance with the guidance of the terminal apparatus 208. In the final step of the guidance by the terminal apparatus 208, the terminal apparatus 208 displays that the power supply of the image forming apparatus 203 should be turned on and detects whether the power supply is turned on (step S112). After the power supply of the image forming apparatus 203 is turned on, the image forming apparatus 203 resumes communication between the terminal apparatus 208 and the image forming apparatus 203 to establish the communication (step S504). In this state, the terminal apparatus 208 checks if the error occurs again in the image forming apparatus 203 (step S114). If the error occurs again (step S505), the aforementioned steps are repeated until the error does not occur as shown in FIG. 9.

As shown in FIG. 9, when the error in the image forming apparatus 203 is cancelled, the image forming apparatus 203 notifies the terminal apparatus 208 that the repair is completed (step S506). Then, the terminal apparatus 208 transmits the work result table including the contents of the work performed by the service staff and the work result to the server 202 through the image forming apparatus 203 (step S507).

The server 202 receives the work result table and then, transmits a repair-job completion notification to the terminal apparatus 208 through the image forming apparatus 203 (steps S508 and S118). Thus, the process is terminated.

In the first embodiment, the terminal apparatus 208 electrically connected to the image forming apparatus 203 is used to store information inputted through the input unit 215 of the terminal apparatus 208 in the memory 214 while the power supply of the image forming apparatus 203 is being turned off, in other words, while the image forming apparatus 203 is being incommunicable with the terminal apparatus 208. When the terminal apparatus 208 starts communicating with the image forming apparatus 203, the information stored in the memory 214 is transmitted to the image forming apparatus 203. This enables to identify the contents of the work such as work items and work procedures of the repair performed while the power supply of the image forming apparatus 203 is being turned off and the result of the work (including a cause of failure)

The work result table as information stored in the memory 214 is transmitted from the terminal apparatus 208 to the server 202 through the image forming apparatus 203 and data-based so that a cause of failure by a model, apparatus configuration and environment can be analyzed in the server 202. When the same error occurs again, the work items are rearranged in descending order of a repairable probability to perform guidance. Thereby, time for repair performed by the service staff can be reduced to improve serviceability.

Second Embodiment

A second embodiment of the present invention is the same as the first embodiment in the configuration shown in FIGS. 1 to 5. The same parts as those in the first embodiment are denoted by the same reference characters and numerals to omit the description thereof. Hereinafter, there are described only the points different from the first embodiment.

In the second embodiment, while the power supply of the image forming apparatus 203 is being turned off, the display of guidance of work procedures and work items to be performed by a service staff is restricted to prevent the service staff from performing a plurality of works at the same time. This enables detail analysis of cause of failure.

Specifically, there is displayed guidance on only one work item on the terminal apparatus 208 while the power supply of the image forming apparatus 203 is being turned off. For example, it is allowable to display guidance on only the work procedure of "1: Connector Insertion and Removal" and it is not allowable to display guidance on other work procedures of "2: replacement of bundle wire" and "3: replacement of substrate."

Figure 14:
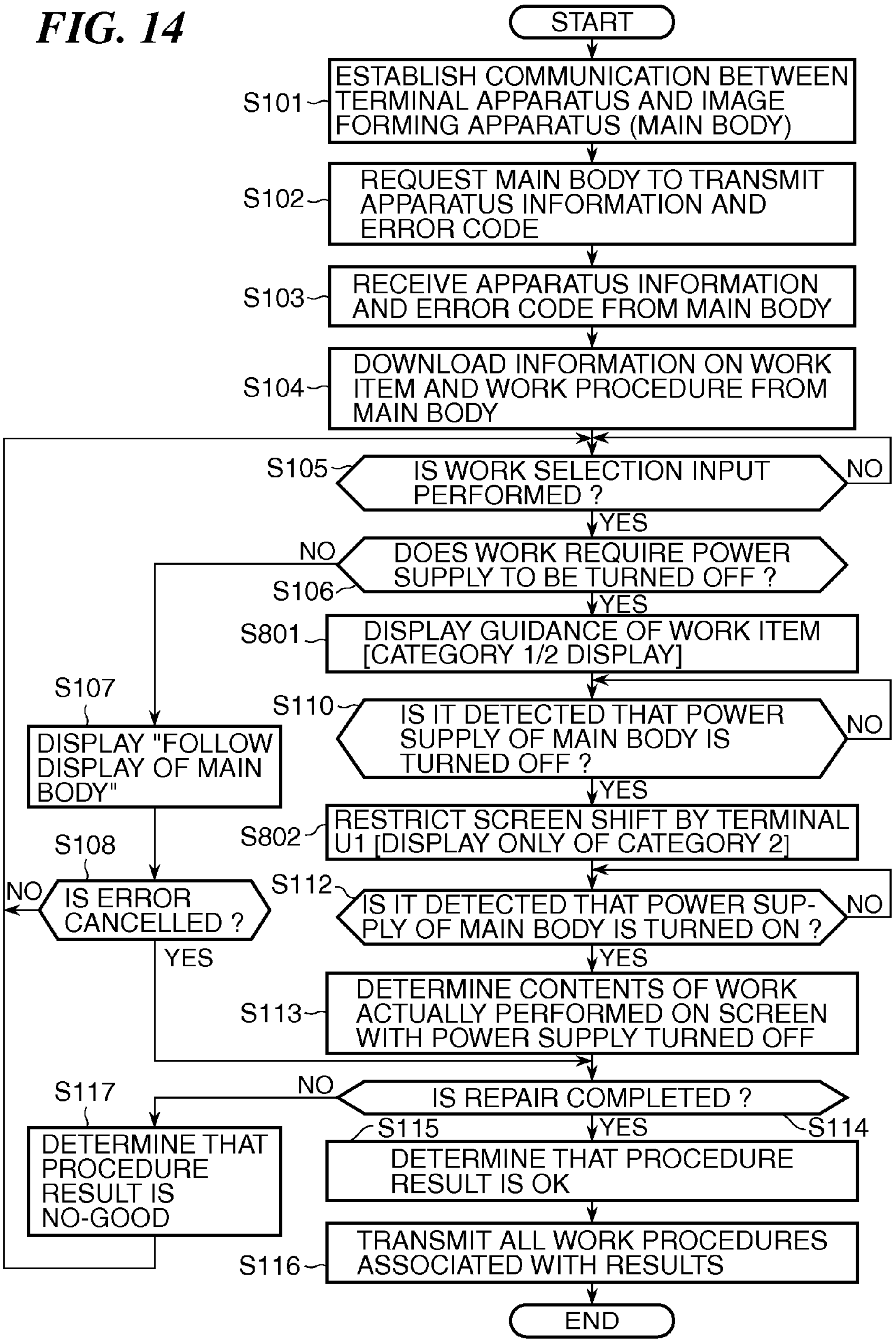
FIG. 14 is a flow chart showing a flow of operation executed in a case where an error occurs in a maintenance system for an image forming apparatus according to a second embodiment of the present invention.
Figure 15A:
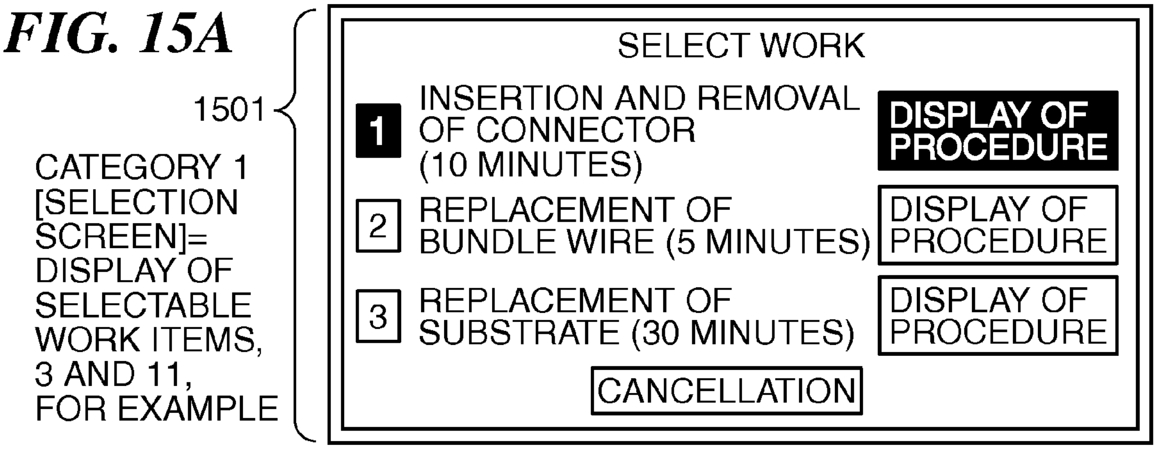
FIGS. 15A and 15B are views showing examples of screens displayed on a terminal apparatus in the flow in FIG. 14, respectively.
Figure 15B:
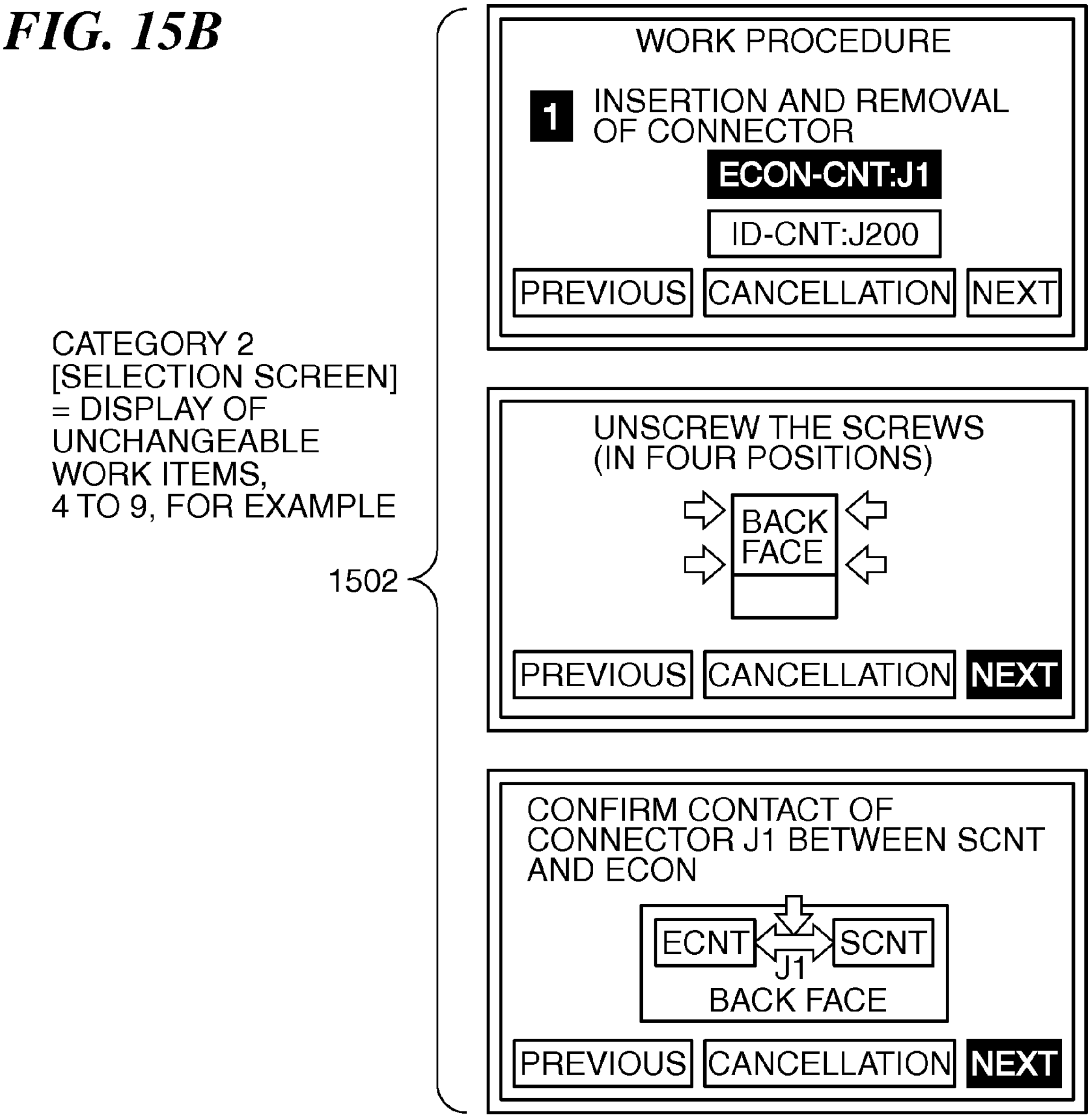

FIG. 14 is a flow chart showing a flow of operation executed in a case where an error occurs in a maintenance system for the image forming apparatus in the second embodiment of the present invention. FIGS. 15A and 15B are views showing examples of screens displayed on the terminal apparatus in the flow in FIG. 14. The steps S101 to S117 in FIG. 14 are the same as the steps S101 to S117 in FIG. 6 in the first embodiment, so that the description thereof is omitted.

In step S801, the terminal apparatus 208 displays guidance on a work item. At this point, the screen displayed on the display unit 212 is "Category 1_1501" shown in FIG. 15A or "Category 2_1502" shown in FIG. 15B and is not restricted in particular. The "Category 1" includes a screen capable of selecting work items and the service staff can view a plurality of work procedures. The term "screen capable of selecting work items" refers to as screens such as, for example, "Display 3", "Display 11" and the like described above. The sentence "the service staff can view a plurality of work procedures" means that the service staff can view the displays of work items, for example: a connector needs to be inserted and removed due to failure resulted from imperfect contact; a bundle wire needs to replace a bundle wire unit due to braking of the bundle wire; and a substrate needs replacement due to the breakdown of elements on various substrates.

A plurality of work procedures can be viewed before the power supply of the image forming apparatus 203 is turned off. Thereafter, when the service staff selects the work item to be actually performed, for example, "1: connector insertion and removal" of "Display 3", the procedure thereof is displayed. After "Display 4", there is displayed an indication that the power supply of the image forming apparatus 203 should be turned off in "Display 5". When the power supply of the image forming apparatus 203 is turned off in accordance with the indication of "Display 5", it is detected that the power supply of the image forming apparatus 203 is turned off in step S110 and the process proceeds to step S802.

In step S802, the terminal apparatus 208 restricts display so as not to enable to display the items (for example, "2: replacement of bundle wire" and "3: replacement of substrate") except for the contents of the work (for example, "1: connector insertion and removal") selected before the power supply of the image forming apparatus 203 is turned off. In other words, the screen which can be displayed with the power supply of the image forming apparatus 203 turned off is a "screen in which a work item cannot be changed" of the "Category 2_1502" shown in FIG. 15B.

According to the second embodiment, the service staff cannot view guidance except for the procedure of the work being currently performed when the power supply of the image forming apparatus 203 is turned off, which surely enables to identify the work performed with the power supply turned off. Consequently, it is possible to identify detailed work procedure, history and a cause of failure. The works of other items can be performed by turning on the power supply and repeating the step S113 and subsequent steps.

In the first and the second embodiments, although "Display 2" to "Display 12" are shown as the repair procedure of the error code "E339-0004", it should be understood that display contents and work items vary with error codes. Display data of screens "Display 1" to "Display 12" can be previously stored in the memory 214 of the terminal apparatus 208, however, the display data can be stored in the image forming apparatus 203 or the server 202. In that case, it should be understood that the terminal apparatus 208 downloads the display data as needed to display it on the display unit 212.

It should be understood that an object of the present invention can be accomplished by supplying a system or an apparatus with a storage medium in which a program code of software which realizes the functions of the above described embodiments is stored, and causing a computer (or CPU or MPU) of the system or the apparatus to read out the program code stored in the storage medium. In this case, the program code itself read from the storage medium realizes the functions of any of the embodiments described above, and hence, the program code and the storage medium in which the program code is stored constitute the present invention.

Examples of the storage medium for supplying the program code include a floppy (registered trademark) disk, a hard disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program can be downloaded via a network.

Further, it is to be understood that the functions of the above described embodiments can be accomplished not only by executing a program code read out by a computer, but also by causing an OS (operating system) or the like which operates on the computer to perform a part or all of the actual operations based on instructions of the program code.

Further, it is to be understood that the functions of the above described embodiments can be accomplished by writing a program code read out from a storage medium into a memory provided on an expansion board inserted into a computer or in an expansion unit connected to the computer and then, causing a CPU or the like provided in the expansion board or the expansion unit to perform a part or all of the actual operations based on instructions of the program code.

Moreover, it is to be understood that the functions of the embodiments described above can be realized by causing the computer to read and execute the program code, and alternatively by causing an operating (OS) system running on the computer to perform a part or all of the actual processing based on instructions in the program code. In this case, the program can be supplied directly from a storage medium on which the program is stored, or from a computer, database, or the like, not shown, that is connected via the Internet, a commercial network, a local area network, or the like.

Although in the above described embodiments, the electrophotographic printing is adopted as the printing method executed by the image forming apparatus 203, there is no intention to limit the invention to this. For example, the present invention can be applied to a variety of printing methods such as ink-jet printing, thermal transfer, thermal printing, electrostatic printing, and discharge breakdown printing.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2008-163670 filed Jun. 23, 2008, which is hereby incorporated by reference herein in its entirety.

What is claimed is:

1. A terminal apparatus capable of communicating with an image forming apparatus, comprising:

an obtaining unit adapted to obtain information related to an error when said terminal apparatus is communicable with the image forming apparatus if the error occurs in the image forming apparatus;

a display unit adapted to display work required to cancel the error based on the information obtained by said obtaining unit;

an input unit adapted to cause a user to selectively input contents of work in accordance with a display on said display unit;

a detection unit adapted to detect whether a power supply of the image forming apparatus is turned on or off; and a control unit adapted to store the contents of work selectively inputted through said input unit in a storage unit when said detection unit detects that the power supply of the image forming apparatus is turned off and transmit the contents of work stored in the storage unit to the image forming apparatus when said detection unit detects that the power supply of the image forming apparatus is turned on.

2. The terminal apparatus according to claim 1, wherein the information related to the error includes information on work items and work procedures related to the cancellation of the error.

3. The terminal apparatus according to claim 1, wherein the contents of work transmitted to the image forming apparatus include work results associated with contents of a performed work.

4. The terminal apparatus according to claim 1, further comprising a restriction unit adapted to perform restriction so that a predetermined work cannot be selected when said display unit displays work required to cancel the error, wherein said restriction unit precludes contents of work except the contents of work selectively inputted through said input unit from being displayed.

5. An image forming apparatus maintenance system, comprising:

an image forming apparatus;

a terminal apparatus capable of communicating with said image forming apparatus; and an information processing apparatus connectable to at least one of said image forming apparatus and said terminal apparatus through a communication line, wherein said terminal apparatus comprises:

an obtaining unit adapted to obtain information related to an error from said image forming apparatus or said information processing apparatus when said terminal apparatus is communicable with said image forming apparatus if the error occurs in said image forming apparatus;

a display unit adapted to display work required to cancel the error based on the information obtained by the obtaining unit;

an input unit adapted to cause a user to selectively input contents of work in accordance with a display on the display unit;

a detection unit adapted to detect whether a power supply of said image forming apparatus is turned on or off; and a control unit adapted to store the contents of work selectively inputted through the input unit in a storage unit when the detection unit detects that the power supply of said image forming apparatus is turned off and transmit the contents of work stored in the storage unit to said image forming apparatus or said information processing apparatus when the detection unit detects that the power supply of said image forming apparatus is turned on.

6. The image forming apparatus maintenance system according to claim 5, wherein the information related to the error includes information on work items and work procedures related to the cancellation of the error.

7. The image forming apparatus maintenance system according to claim 5, wherein the contents of work transmitted to said image forming apparatus include work results associated with contents of a performed work.

8. The image forming apparatus maintenance system according to claim 5, wherein said terminal apparatus further comprises a restriction unit adapted to perform restriction so that a predetermined work cannot be selected when the display unit displays work required to cancel the error, wherein the restriction unit precludes contents of work except the contents of work selectively inputted through the input unit from being displayed.

* * * * *